Patented May 21, 1935

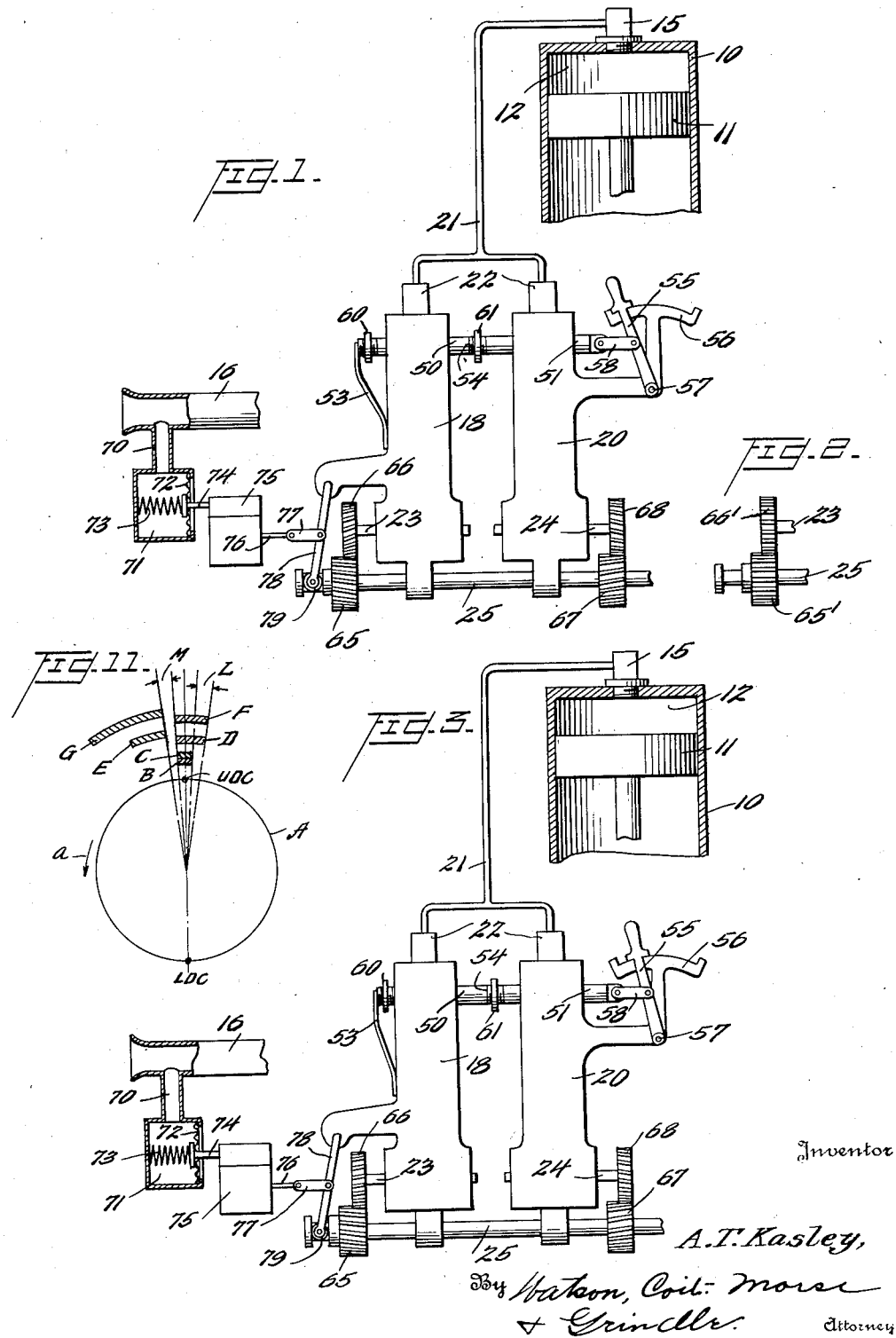

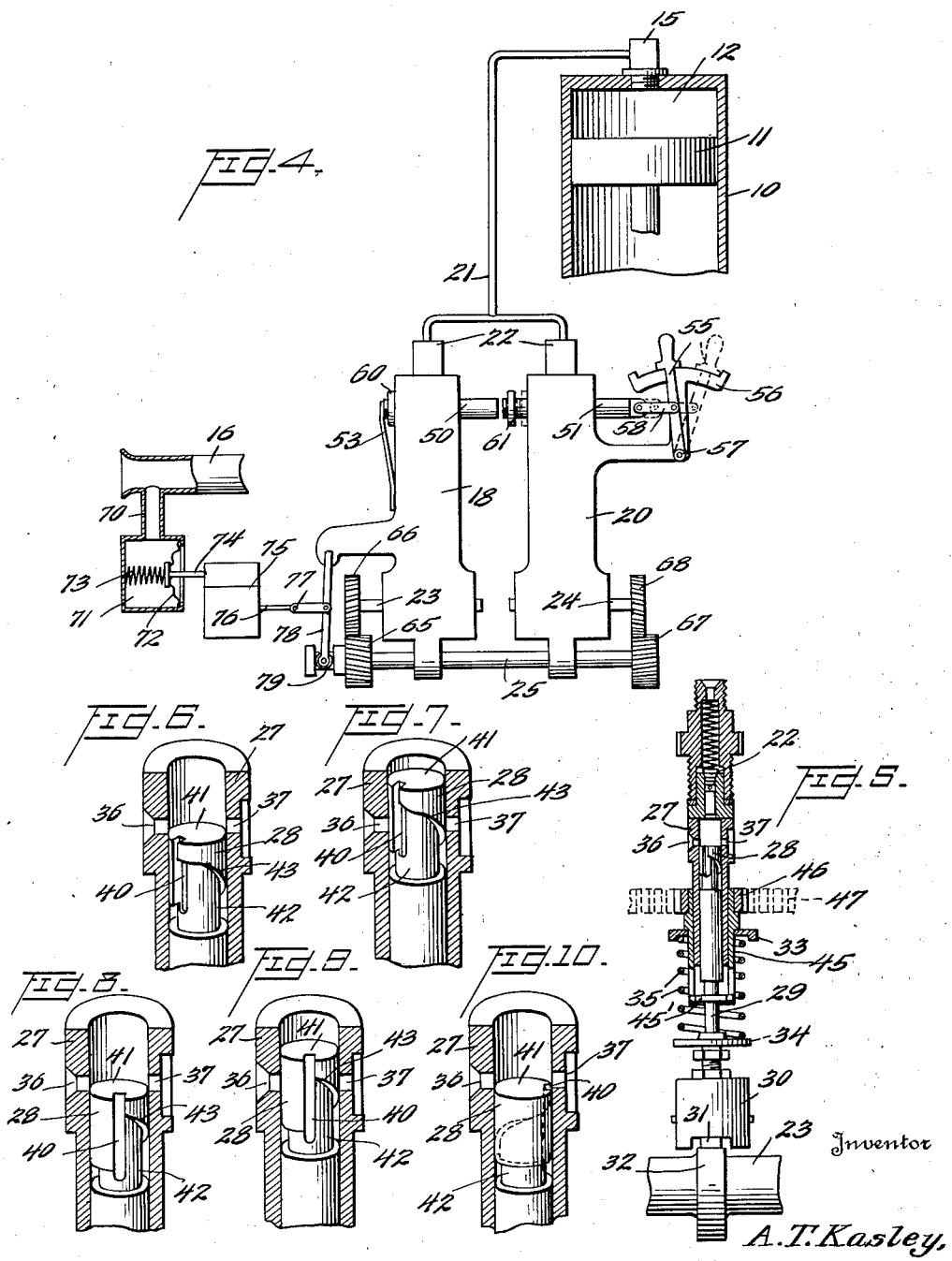

2,001,843

UNITED STATES PATENT OFFICE 2,001,843

FUEL INJECTION SYSTEM FOR INTERNAL COMBUSTION ENGINES

Alexander T. Kasley, Prospect Park, Pa., assignor to D. C. E. Development Company, Wilmington, Del., a corporation of Delaware Application May 12, 1933, Serial No. 670,779
Renewed February 11, 1935

9 Claims. (Cl. 123—139)

This invention relates to fuel feeding systems for internal combustion engines and it has more particularly to do with systems of this character by which charges of liquid fuel are injected into the air or other combustion supporting means in the combustion chamber of the engine, and ignited by any suitable means.

The general object of the invention is the provision of a novel and improved fuel feeding system of this type and a novel method of operation of an internal combustion engine afforded by the use of this system.

A further object of the invention is to provide means for eliminating high peak pressures in the working cylinders of internal combustion engines of this type.

Another object is to increase the velocity of the fuel injection at low or idling speeds. This increase in velocity causes the injection nozzle to deliver a finer fuel spray, thus effecting more turbulence, better mixing of the fuel, and more efficient combustion. Higher injection velocities also tend to prevent fouling of the nozzle.

It is well known that in the operation of Diesel engines and other "solid injection" internal combustion engines of this type, the volume of the fuel charges must be measured with a high degree of accuracy and the timing of the delivery of these charges must be equally as exact. Furthermore, since the fuel is injected against considerable back pressure from the cylinder, the fuel supplying means must be of sturdy construction and its controlling and operating means must be of corresponding strength but capable of ready adjustment in accordance with changing conditions of speed and load.

These qualifications find full response in the present system, and in fulfillment thereof the invention in its preferred embodiment contemplates the provision of two (or more) separate and distinct pumps for each cylinder of the engine, which are adapted to deliver, preferably to a single injection nozzle, separate variable charges of fuel, either simultaneously as at low or idling speeds or sequentially as at higher engine speeds. A variable timing device may be applied to either one or both of the pumps, and in the case in which the timing of both of the charges can be varied, the shot from the primary pump may be injected into the combustion chamber before, at, or after upper dead center position, and the shot from the secondary pump may be similarly timed in accordance with the desired conditions.

For operating the engine at low speeds, it is preferred that the injection of both the primary and the secondary charges shall be either coincident or overlapping and, of course, during the time when both pumps are delivering their charges of fuel to the nozzle, the velocity of fuel will be much higher than if the pumps were operating singly.

For running at high speeds, the primary shot is injected first and preferably earlier than at low speed operation, and the secondary charge is delayed considerably so that there is an interval or lag between the injection periods of the two charges. The maximum amount of fuel that can be injected during the primary shot is preferably limited by an adjustable stop associated with the controlling element of the pump. The adjustment of the pump furnishing the secondary charge may be carried further than that of the primary pump, and consequently under large loads the amount delivered during the secondary shot is somewhat greater. The maximum amount that can be delivered by the secondary shot together with the amount supplied at the upper limit of adjustment of the primary pump corresponds to the maximum possible fuel supply for the cylinder. The quantitative adjustment of the several injections by the pumps is controlled manually by suitable means, examples of which will be described in detail. It is preferred that the change in the timing of the charges required for a change from low speed conditions to intermediate or high speed conditions be accomplished automatically by utilizing the vacuum in the air intake manifold pipe or by means of other suitable governing devices.

Other objects and features of novelty will be apparent to one skilled in the art from the following specification when read in connection with the accompanying drawings in which certain embodiments of my invention are illustrated by way of example.

In the drawings:

Figure 1 is a more or less diagrammatic elevational view of one installation embodying the principles of my invention; the various parts being in the respective positions which they occupy when the engine is at a standstill;

Figure 2 is a fragmentary view of certain gearing which may be employed in a modified form of the fuel feeding device;

Figure 3 is a view in elevation of the arrangement shown in Figure 1 under conditions of idling speed of the engine;

Figure 4 is a similar view showing the relation of the parts of the system under conditions of intermediate speed and load; and in dotted lines there is shown the altered relation of certain parts at high or intermediate speeds and full load;

Figure 5 is a vertical sectional view of the interior mechanism of one of the pumps;

Figures 6 and 7 are fragmentary vertical cross-sectional views of the piston and certain of the ports of a pump cylinder under conditions of high load or speed, at the beginning and end of the effective stroke of the piston respectively;

Figures 8 and 9 show similar positions of the piston under conditions of lower speed and load;

Figure 10 is a similar view of the piston when the engine is stopped; and

Figure 11 is a diagram showing the phase relations of the charges to the engine cycle under various conditions of speed and load corresponding to the positions of the controlling elements in Figures 1, 3 and 4.

Referring more particularly to Figures 1, 3 and 4 of the drawings, it will be seen that the numeral 10 designates one of the cylinders of an internal combustion engine of the type which is adapted to be fed by my improved installation. The power piston 11 is, of course, arranged for reciprocation within the cylinder 10. The fuel is introduced into the combustion chamber 12 of the cylinder by means of a spray nozzle 15 of any approved type. Many of such nozzles are provided with spring pressed check valves to prevent dribbling and to render the metering of the charge more accurate, but the particular construction of the injection nozzle forms no part of the present invention and therefore will not be described. The air or other oxygen supplying medium for supporting the combustion of the fuel may be introduced to the combustion chamber 12 by any suitable means. A portion of the intake pipe for this medium is shown at 16 in Figures 1, 3 and 4 for a purpose which will develop as the description proceeds. The ignition of the fuel in the combustion chamber may be accomplished by any of various well-known means including compression ignition, spark ignition, hot points, glow plugs, etc.

In the exemplary embodiment of my invention which is disclosed in the present specification, two fuel injecting pumps are provided for each cylinder, but it is understood that the number of pumps may be varied as desired within the scope of the subjoined claims.

Of the two pumps illustrated in the drawings, the one to which the numeral 18 is applied may be designated the primary pump, and the numeral 20 is applied to the secondary pump. These pumps are adapted to deliver their respective charges of fuel to the combustion chamber 12, preferably through the single injection nozzle 15, and for this purpose the three-way conduit 21 is provided. In each of the branches of this conduit leading from the pumps, there is provided a non-return or check valve 22. The pumps 18 and 20 may be of any suitable type, but for the purpose of illustration there have been selected pumps of the type which depend upon the rotation of suitably grooved pistons for the regulation of the volume of the charges of fuel delivered. The reciprocating pistons of the pumps are actuated by cam shafts, the one for operating the pump 18 being shown at 23 and the cam shaft of pump 20 being designated 24. These cam shafts are operatively connected with the driving counter shaft 25 by gearing which will be later described.

The interior mechanism of a pump of this type is shown in Figure 5 of the drawings in which the pump cylinder is designated 27 and the numeral 28 is applied to the pump piston. The piston rod or plunger 29 is provided with a tappet member 30 which carries the cam contacting roller 31. The cam 32 formed on the cam shaft 23, 24 is arranged to reciprocate the pump plunger in the well-known manner. Spring stop members 33 and 34 are provided on a stationary part of the pump and the plunger 29 respectively, and between these stops there is disposed a coil spring 35 which is adapted to continually urge the plunger toward its lowermost position. The pump cylinder 27 is provided with an outlet port which is controlled by the check valve 22. An inlet port 36 and a by-pass port 37, which may also act as an inlet port, are in communication with a source of fuel supply which is preferably positioned above the level of these openings.

The pumps employed for purpose of illustration are of the constant stroke type, and in order to vary the quantity of fuel delivered upon each stroke of the piston, the piston is provided with certain grooves and slots which cooperate with the ports 36 and 37 to control the admission and cut-off of the individual charges of fuel. As will be readily understood from Figures 6–10 inclusive, the plunger or piston 28 is provided with a vertical groove 40 which extends from the upper surface 41 of the piston to the lower groove 42, the upper margin 43 of which is in the form of a helix. Upon the upward movement of the top surface 41 of the plunger past the openings or ports 36 and 37 the fuel which is imprisoned within the chamber of the pump will be ejected through the outlet valve 22 toward the cylinder of the engine. This ejection will continue until the helical edge 43 of the piston 28 registers with the lower edge of the by-pass port 37, whereupon the pressure is released and the fluid in the pump cylinder 27 during the remainder of the stroke of the piston 28 passes through the vertical groove 40 and the annular groove 42, and the by-pass port 37 back to the source of supply. It will now be very readily seen that the point of cut-off of the charge at which the fluid will cease to be delivered through the valve 22 and will return through the by-pass port 37, will be varied by rotation of the piston 28. In Figures 6 and 7 the rotative position of the piston 28 is shown adjusted for a relatively large volume of fluid to be delivered upon each stroke since the distance from the top surface 41 to the point at which the helical edge 43 passes the by-pass port is nearly at its maximum. It will be understood, of course, that Figure 6 illustrates the lower dead center position of the plunger or piston 28 and Figure 7 illustrates the position of the piston at the termination of the injection of a charge of fuel. When adjusted as shown in Figures 8 and 9 of the drawings, the pump will deliver an intermediate quantity of fuel upon each stroke and when the vertical groove 40 is brought by sufficient rotation of the piston into registry with the by-pass port 37, all of the fluid will be by-passed and none will be delivered to the engine. This last described position is, of course, the one at which the engine is at a standstill.

Again referring to Figure 5 of the drawings, the means for rotating the piston will now be described. A sleeve or bushing 45 is mounted for rotation around the lower portion of the cylinder 27 and while the plunger 29 is permitted to reciprocate relatively to the sleeve 45 these members are arranged for unitary rotation by the provision of the sliding connection 45' upon the piston rod 29 which fits a correspondingly formed portion of the sleeve 45. Upon the upper end of the sleeve 45 there is provided a gear 46 which is adapted to be rotated by means of the rack 47 formed upon the actuating rod, designated 50 in the case of the primary pump 18, and 51 in the case of the secondary pump 20.

In the preferred embodiment of the invention disclosed, the volume controlling rod or shaft 50 for the primary pump is adapted to be urged toward maximum volume position by suitable means which may take the form of the leaf spring 53. The shafts 50 and 51 are in longitudinal alignment and in low speed positions they abut each other as at 54. The shaft 51 of the secondary pumps is adapted to be positively and manually operated by means of the lever 55 movable with relation to the quadrants 56, fulcrumed at 57 to a portion of the frame of the pump assembly and connected to the shaft 51 by means of the link 58. If desired, lever 55 may be arranged to be operated by a governor in any suitable or known manner. An adjustable stop, shown in an elementary form for purposes of illustration at 60, is provided on the shaft 50 to limit its movement in the volume increasing direction. The shaft 51 is also provided with an adjustable stop 61 which is generally set so as to enable the shaft 51 of the secondary pump to move further in the said direction and thus cause the secondary pump 20 to deliver a greater charge than the primary pump. The shaft 50 under the influence of the spring means 53 will follow the shaft 51 until the stop 60 prevents further movement, but the shaft 51 may continue to the limit of movement of the lever 55 upon the quadrant 56, (or of the stop 61). In Figure 1, both shafts are shown in their extreme left hand positions which they assume when the engine is at a standstill. In Figure 3 both shafts have been moved a slight distance toward the right permitting a small volume of charge to be formed and delivered by each pump. In Figure 4 it will be seen that the primary pump 18 has reached the maximum limit of volume of its charge, and as shown in full lines, the control shaft 51 of the secondary pump 20 is in position to deliver a slightly greater proportionate charge than the primary pump 18. The dotted line position of the parts shows the extreme maximum limit of delivery of the secondary pump.

In the positions illustrated in Figure 3, both pumps are delivering relatively small separately formed charges simultaneously and therefore the total injection is being delivered to the combustion chamber at a relatively high velocity. This is the ideal condition of operation at low or idling speeds. When the parts are in the positions shown in Figure 4 in solid lines, the engine is operating under conditions of intermediate load, and of course when in the dotted line position of this figure, the maximum limit of injection is reached.

The mechanism for regulating the timing of the charges developed by the primary and secondary pumps will now be described. Under conditions of intermediate and high speeds with corresponding loads, it is desirable that the delivery time of at least a portion of the fuel to the combustion chamber be advanced, and it is also desirable that other portions of the total fuel delivered be delayed, preferably until a suitable interval after the cut-off of the injection of the first portion. In the system described herein wherein two separate and distinct charges are supplied, means are provided for advancing the admission of the first charge and retarding the admission of the secondary charge independently of the increase in the quantity of the charges. By these means a sudden or violent rise of pressure in the combustion chamber at the start of the injection period is avoided since the separate charges are too small to cause excessive peaks of pressure. This prevents pounding on the main bearings and crank pins of the engine. Another effect of the separate and sequential injection of the fuel charges is found in the fact that the burning of the relatively small primary charge raises the temperature within the combustion chamber and adds to the turbulence therein, so that upon the admission of the secondary charge, conditions are favorable for efficient combustion. During the interval or lag between charges the piston has descended somewhat which naturally increases the turbulence and the turbulence has moved uncombined oxygen into the path of injected fuel, and at the same time a comparatively constant pressure is maintained within the combustion chamber for a longer period of time than in arrangements heretofore employed. In this way it is possible to insert more fuel during a given cycle, burn it more completely, and thus increase the output of the engine.

The variations in timing of the several pumps are accomplished by shifting the countershaft 25 longitudinally. This countershaft is provided with gears 65 and 67 which are adapted to mesh with the gears 66 and 68 carried by the cam shafts 23 and 24 respectively. If the timing of the injection periods of both of the pumps is to be altered, one to be advanced and the other retarded, both sets of gears 65, 66 and 67, 68 are provided with spiral teeth, but the inclination of the teeth in the two pairs of gears is in opposite directions. Thus it will be seen that when the shaft 25 is shifted toward the right in the figures of the drawings, the phase relations of the cam shafts and pistons of the primary and secondary pumps 18 and 20 will be correspondingly shifted with relation to the cycle of the engine. This shifting may be accomplished by any sort of speed control governor but is preferably operated by a vacuum controlled governor associated with the air intake pipe 16 of the engine. A conduit 70 serves to connect this intake pipe 16 with a chamber 71 which is provided with a diaphragm 72 which is urged outwardly by means of the adjustable coil spring 73. The diaphragm is operatively connected by means of a shaft 74 with a relay 75 which converts the movement of the diaphragm 72 and shaft 74 into a corresponding movement of the shaft 76 and link 77, which through the lever 78 and connection 79 causes the counter shaft 25 to be adjusted. Upon the increase of the speed of the engine to a predetermined point, the vacuum developed by the intake pipe 16 causes the diaphragm 72 to move toward the left and against the pressure of the spring 73, and this movement causes the counter shaft 25 to move toward the right thus shifting the phase relations of the pumps. This shifted position is illustrated very clearly in Figure 4 of the drawings. If it is desired to retard the phase of the secondary pump 20 and allow the timing of the admission of the charge from the primary pump 18 to remain unchanged, the cam and counter shaft gears of the latter pump are provided with straight teeth as shown at 65', 66' in Figure 2.

The graphic illustration of the changes in volume or duration of the primary and secondary charges and in their phase relations is set forth in the diagram of Figure 11. The circle A indicates the complete cycle of operation of one cylinder of the engine, the direction of rotation being indicated by the arrow a. The lower dead center position is indicated by the letters LDC and the upper dead center position is indicated by the letters UDC. In the case where the pumps are of equal size and adapted to deliver equal quantities of fuel during low speed operation the separate charges of the primary and secondary pumps 18 are indicated at B and C respectively. When the lever 55 is moved toward the right, both charges increase up to a certain point and when the proper condition of speed is reached, the timing control is shifted and the primary charge is advanced and the secondary charge is retarded, as indicated at D and E respectively in Figure 11, both of said charges being increased in volume and an angle L of advance of the primary charge and an angle M of lag introduced in the cycle. Beyond the point at which the stop 60 prevents further increase in the primary charge, this charge will remain constant as indicated by the relation between the angular extents of D and F in the diagram. A further increase in the secondary charge beyond this point is indicated by the increased angular extent of the area G.

It will be understood that the volume control lever may be moved to its extreme right hand position and still the load may be so great that the revolutions of the engine have not increased sufficiently to shift the counter shaft 25 inward to change the relative timing of the primary and secondary pumps. In this event an increase in travel of the control shaft 50 of the primary pump may be permitted by a manual adjustment of the stop 60. This will maintain the high velocity of entry of the fuel into the combustion chamber 12 regardless of the relatively low speed of the engine.

It should be noted that separate and distinct pump units may be employed or any number of units may be combined in one housing. Furthermore the output of the individual units may be equal or unequal so long as the relative operation of the units is controlled as has been described.

It will be understood that various other changes and modifications of the embodiment illustrated and described herein may be made without departing from the scope of the invention as set forth in the following claims.

Having thus described the invention, what is claimed as new and desired to be secured by Letters Patent is:

1. In a fuel feeding system for internal combustion engines, a plurality of pump units, separate conduits connecting said units with the injection nozzle of the combustion chamber of the engine whereby distinct charges of fuel may be delivered to said nozzle, separate aligned shafts operatively connected with the mechanism of said pump whereby axial movement of said shafts effects changes in the volumes of said fuel charges, said shafts being arranged in abutting relation, means for moving said shafts in one direction simultaneously, a stop on one of said shafts for limiting its movement in one direction, means for continuing the movement of another of said shafts after the first shaft has stopped, whereby certain of said pumps may deliver a larger charge than others.

2. The method of operating internal combustion engines having an injection nozzle in the combustion chamber, which includes the steps of forming a plurality of separate charges of fuel and delivering them simultaneously to said nozzle during low speed operation of the engine, whereby the injection velocity is increased; increasing the volume of both of said separate charges to a predetermined point; thereafter increasing one of said charges only; and governing the timing of said charges at higher speeds in response to the speed changes.

3. The method of operating internal combustion engines having an injection nozzle in the combustion chamber, which includes the steps of forming a plurality of separate charges of fuel and delivering them simultaneously to said nozzle during low speed operation of the engine, whereby the injection velocity is increased; increasing the volume of both of said separate charges to a predetermined point; thereafter increasing one of said charges only; and retarding the timing of one of said charges at higher speeds of operation of said engine, whereby the variable charges are introduced in sequence instead of simultaneously, the velocity is diminished and the phase angle is increased.

4. The method of operating internal combustion engines having an injection nozzle in the combustion chamber, which includes the steps of forming a plurality of separate charges of fuel and delivering them simultaneously to said nozzle during low speed operation of the engine, whereby the injection velocity is increased; increasing the volume of both of said separate charges to a predetermined point; thereafter increasing one of said charges only; and retarding the timing of one of said charges and advancing that of the other at higher speeds of operation of said engine, whereby the variable charges are introduced in sequence instead of simultaneously, the velocity is diminished, and the phase angle is increased.

5. In a fuel feeding system for internal combustion engines, a plurality of pump units, separate conduits connecting said pump units with the injection nozzle of the combustion chamber of the engine, a check valve in each of said conduits whereby a plurality of separate charges of fuel may be injected through said nozzle, means for varying the relative timing of said charges, and means for varying the quantity of said charges.

6. In a fuel feeding system for internal combustion engines, a plurality of pump units, separate conduits connecting said pump units with the injection nozzle of the combustion chamber of the engine, a check valve in each of said conduits whereby a plurality of separate charges of fuel may be injected through said nozzle, means governed by the speed of said engine for varying the timing of said charges, and manually operated means for varying the quantity of said charges.

7. In a fuel feeding system for internal combustion engines, a pressure device adapted to inject a plurality of distinct charges of fuel into the combustion chamber of the engine, and means associated with said device for varying the timing of said injections so that the charges may be coincident, overlapping, or separated in point of time.

8. In a fuel feeding system for internal combustion engines, a pressure device adapted to inject a plurality of distinct charges of fuel into the combustion chamber of the engine, means associated with said device for varying the timing of said injections so that the charges may be coincident, overlapping, or separated in point of time, and for varying the quantity of each charge.

9. In a fuel feeding system for internal combustion engines, a pressure device adapted to inject a plurality of distinct charges of fuel into the combustion chamber of the engine, means associated with said device for varying the timing of said injections so that the charges may be coincident, overlapping, or separated in point of time, and additional means for varying the quantity of each charge.

ALEXANDER T. KASLEY.